United States Patent Office 2,954,224
Patented Sept. 27, 1960

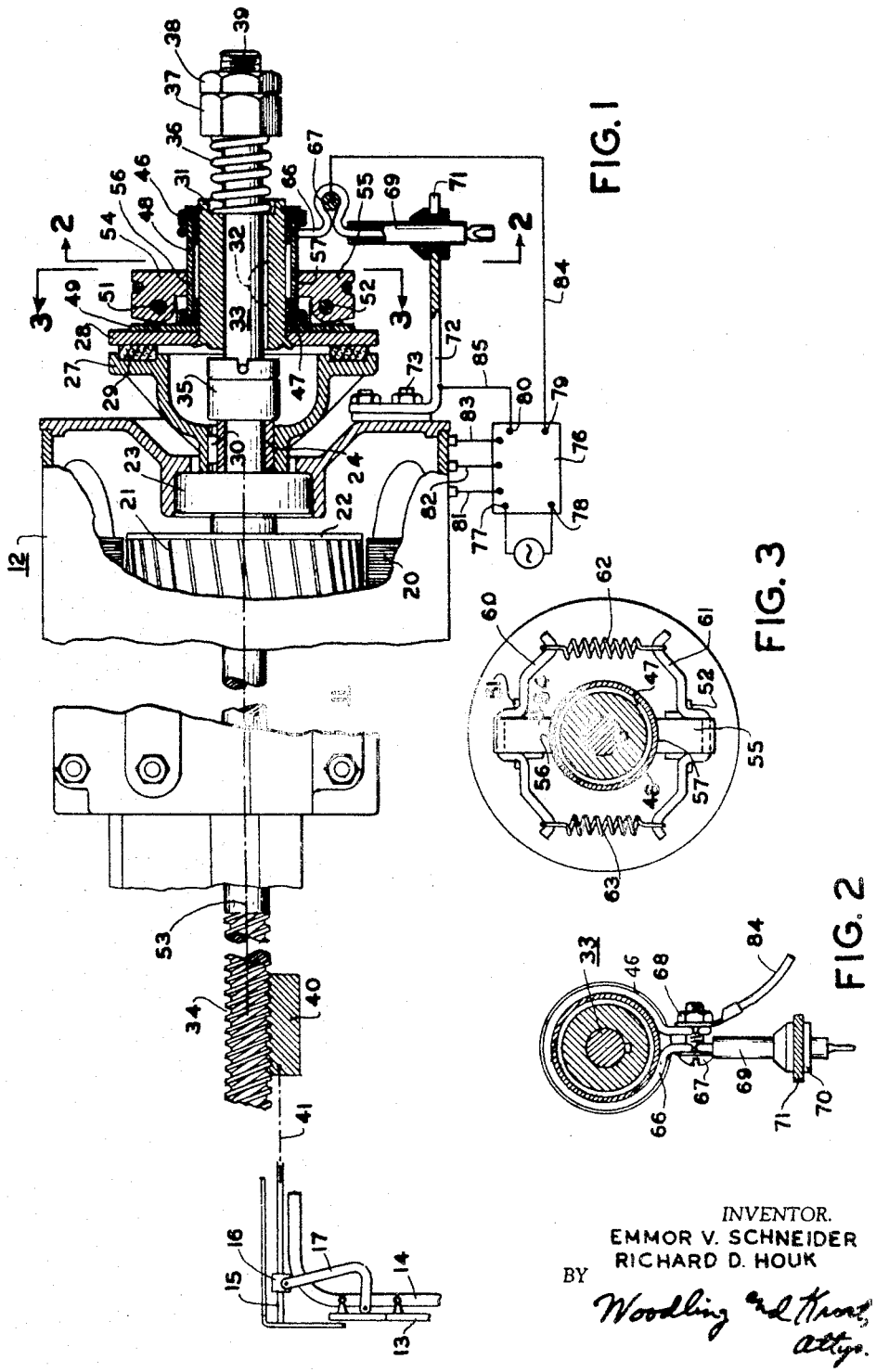
*INVENTOR.*
EMMOR V. SCHNEIDER
RICHARD D. HOUK
BY
Woodling and Krost
attys.

2,954,224

TORQUE SWITCH

Emmor V. Schneider and Richard D. Houk, Alliance, Ohio, assignors to The Alliance Manufacturing Company, Division of Consolidated Electronics Industries Corporation, a corporation of Delaware Filed June 23, 1958, Ser. No. 743,908

12 Claims. (Cl. 268—59)

The invention relates in general to electrical switches responsive to a torque condition and more particularly to an electrical control circuit for controlling a drive means in response to torque and controlled by a torque responsive switch. The prior art has known forms of centrifugal switches wherein centrifugal force overcomes some urging means such as a spring to actuate a switch. Such devices have been built into and a part of electric motors. The function of such switches has been directly related to a motor function such as for causing the motor to be energized in a starting winding, and then after a certain speed is reached a main or running winding is energized and the starting winding de-energized. As such, the centrifugal switch is directly connected for operation with the rotor of the motor. In such prior art centrifugal switches the centrifugal switch is not responsive to a condition of the load, rather it is primarily responsive to an operating condition of the motor itself.

An object of the present invention is to provide a switch responsive to the torque requirements of a load.

Another object of the invention is to provide a torque responsive switch generally connected with a motor but responsive to the torque requirements of the load driven by the motor.

Another object of the invention is to provide a torque switch actuated by the driven member of a friction clutch to be responsive to load torque requirements.

Another object of the invention is to provide a torque switch operated centrifugally by the operational speed of a clutch driven member.

Another object of the invention is to provide an electrical control circuit to control energization to a motor in accordance with the torque requirements of the load driven by the motor.

Another object of the invention is to provide an electrical control circuit for a motor driving a load through a friction clutch wherein, upon excess torque requirements of the load, the clutch may slip and a torque switch causes de-energization of the motor.

Another object of the invention is to provide a garage door operator control circuit wherein an electric motor drives a garage door through a friction clutch and a torque switch is responsive to speed of rotation of the driven member of the friction clutch whereby, when the door closes and stalls, this stalls the clutch and actuates the torque switch to de-energize the motor.

Other objects and a fuller understanding of this invention may be had by referring to the following description and claims, taken in conjunction with the accompanying drawing, in which:

Figure 1 is a combined schematic diagram and longitudinal sectional view through a door operator embodying the invention;

Figure 2 is a sectional view on line 2—2 of Figure 1; and

Figure 3 is a sectional view on line 3—3 of Figure 1.

Figure 1 shows generally a garage door operator 11 including a motor 12 operating through linkage means to open and close a door 13. The door has been shown as an overhead type of garage door which may move upwardly to an open position and downwardly to a closed position. This movement may be on a track 14. A guideway 15 may guide movement of a carriage 16 which moves longitudinally thereof and through a link 17 causes opening and closing movements of the door 13.

The motor 12 has a stator 20 and a rotor 21 with a first end 22 of the rotor 21 being at the right as viewed in Figure 1. The rotor 21 is journalled in a radial bearing 23 in the stator 20 and the entire rotor 21 has a hollow shaft 24.

A friction clutch includes a circular drive member 27 and a circular disc driven member 28. Friction material 29 may be carried in the drive member 27. The drive member 27 is fixedly carried on the hollow shaft 24 by a key 30 for rotation therewith. The driven member 28 also includes a hub 31 fixedly keyed at 32 to a shaft extension 33 of a worm 34. This shaft extension 33 extends through and is journalled in the rotor 21 and carries a thrust bearing 35 for engagement with the end of the hollow rotor shaft 24. The hub 31 and disc driven member 28 are fixed to rotate together.

A coil compression clutch spring 36 surrounds the outer end of the shaft extension 33 and a nut 37 and a lock nut 38 engages a threaded end 39 on the shaft extension 33 to cause variable compression of the clutch spring 36. This causes variable friction engagement between the drive and driven members 27 and 28 of the clutch.

The worm 34 engages nut means 40 to cause longitudinal traverse of this nut means which is connected by a link 41 to the carriage 16 to cause the door 13 to be opened and closed upon proper rotational operation of the rotor 21. The hub 31 journals first and second insulating rings 46 and 47 which carry a metallic cylindrical sleeve 48. A plate 49 on the clutch driven member 28 carries first and second pivot axes which are perpendicular to the axis 53 of the worm 34 or clutch driven member 28. These pivot axes 51 and 52 are also displaced equidistant from this axis 53 on opposite sides of this axis. First and second weights or contact arms 54 and 55 are journalled on the pivot axes 51 and 52. Contact surfaces 56 and 57 are provided on the inner ends of these contact arms 54 and 55, respectively. As shown in Figure 3, spring legs 60 and 61 are mounted on the contact arms 54 and 55, and the ends of these spring legs are urged together by switch springs 62 and 63.

The center of gravity of the contact arms 54 and 55, as viewed in Figure 1, is displaced to the right relative to the plane established by the pivot axes 51 and 52; hence, upon rotation of the clutch driven member 28 above a pre-determined speed, the weights 54 and 55 will centrifugally move outwardly so that the contact surfaces 56 and 57 break contact with the sleeve 48.

A clamp 66 is shown in Figures 1 and 2 and encircles and clamps on the sleeve 48 by a bolt 67 and nut 68. An insulating sleeve 69 encircles the outer end of the wire-like clamp 66, and an insulating bushing 70 further surrounds the sleeve 69 and is engaged by the U-shaped end 71 of an L-shaped bracket 72. The bracket 72 is mounted on one of the mounting bolts 73 of the stator 20.

The Figure 1 shows schematically an electrical control circuit 76 which has voltage source input terminals 77 and 78, and control terminals 79 and 80. The electrical control circuit 76 is also connected to the motor by energization conductors 81, 82, and 83 to supply energization for forward and reverse conditions to said motor 12. The control terminal 79 is connected by a conductor 84 to the clamp 66 at the nut 68 and the control terminal 80 is connected by a conductor 85 to be grounded to the motor stator 20 at any convenient location such as the mounting bolt 73. The clutch driven member 28 is also grounded to the motor stator 20 by the direct metallic connection through the shafts 33 and 24 and bearings 23 and 35. The electrical control circuit 76 may be similar to that shown in the copending application entitled "Electrical Control Circuit" of Emmor V. Schneider, Serial Number 743,909, filed concurrently herewith.

*Operation*

The electrical control circuit 76 may be controlled in any suitable manner to provide energization to the motor 12 to run in a hoisting or lowering direction to raise or lower the door 13. Figure 1 shows the door in the downward or closed position. Upon energization of the motor to run the door from its open to its closed position, for example, the motor as it comes up to speed causes opening of the torque switch 56—48. This may conveniently be at about one-half the operational speed of the motor, for example, about 810 r.p.m. for a 1725 r.p.m. motor. The clutch 27—28 is adjustable as to the point at which it will slip by the variable compression of the clutch spring 36. Generally the clutch will be adjusted to be tight enough to start and move the door under normal operating conditions but to slip upon a definite overload so that should the door strike some obstacle the clutch will slip and thus not damage the obstacle which has blocked movement of the door. One such definite obstacle would be the down travel limit of the door 13 where it strikes the floor of the garage. At this point the clutch 27—28 would slip because the door has stalled, stalling the nut means 40 and the worm 34; and hence, as the clutch driven member 28 slows to a stalling point, the point of about half speed in deceleration will be reached to close the torque switch 56—48. This will control the electrical control circuit 76 in such a manner as to de-energize the motor 12. This may be done in any suitable manner such as energizing or de-energizing a relay by the closing of these torque switch contacts 56—48 and the actuation of such relay can cause de-energization of the motor 12. This torque switch 56—48 is thus responsive to an overload of torque requirements in the load, in this case the garage door 13, or any of the linkage between this door and the output shaft which in this case is the shaft 33. The use of the torque switch 56—48 provides prompt de-energization of the motor 12 and thus prevents the motor from grinding away causing the clutch 27—28 to slip whenever an obstacle is met which stalls the door 13.

The clamp 66 holds the sleeve 48 stationary; and hence, during acceleration of the motor from rest the contact surface 56 will ride on the sleeve as a slip ring maintaining contact until the pre-determined speed is reached whereat centrifugally the contact arms 54 and 55 move away from the sleeve 48.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A torque responsive switch comprising, in combination, a rotatable member, a contact arm, a contact surface on said contact arm, said contact arm having a finite weight, a metallic cylindrical sleeve, means mounting said contact arm and said metallic sleeve relatively insulated on said rotatable member, switch spring means urging said contact arm toward the axis of said rotatable member to urge said contact surface into electrical contact engagement with said metallic sleeve, means providing separate electrical connections to said metallic sleeve and to said contact arm, whereby upon rotation of said rotatable member above a predetermined speed, said contact arm centrifugally moves said contact surface away from said metallic sleeve to break electrical contact therewith to open said torque switch, and whereby upon rotation of said rotatable member below said predetermined speed said contact surface of said arm electrically contacts said metallic sleeve to close said torque switch.

2. A torque responsive switch comprising, in combination, a rotatable member, first and second contact arms, contact surfaces on said contact arms, each contact arm having a finite weight, a metallic cylindrical sleeve, means mounting said contact arms and said metallic sleeve relatively insulated on said rotatable member, switch spring means urging said contact arms toward each other to urge said contact surfaces into electrical contact engagement with said metallic sleeve, means providing separate electrical connections to said metallic sleeve and to said contact arms, whereby upon rotation of said rotatable member above a predetermined speed, said contact arms centrifugally move said contact surfaces away from said metallic sleeve to break electrical contact therewith to open said torque switch, and whereby upon rotation of said rotatable member below said predetermined speed said contact surfaces of said arms electrically contact said metallic sleeve to close said torque switch.

3. In an electrical control circuit for an electric motor driving a load through a slippable clutch having drive and driven members, a torque responsive switch comprising, in combination, a weight member, a contact surface operable by said contact member, said contact member having a finite weight, a metallic member, means mounting said contact surface and said metallic member in mutually insulated relationship, means operably connecting said weight member to said clutch driven member, switch spring means urging said contact surface toward electrical contact engagement with said metallic member, means providing separate electrical connections to said metallic member and to said contact surface, whereby upon rotation of said clutch driven member above a predetermined speed, said contact member centrifugally moves to move said contact surface away from said metallic member to break electrical contact therewith to open said torque switch, and whereby upon an overload in the torque requirements of said load said clutch slips to slow said clutch driven member to cause said contact surface to electrically contact said metallic member to control said electrical control circuit.

4. In an electrical control circuit for an electric motor driving a load through a friction clutch having drive and driven members, a torque responsive switch comprising, in combination, first and second contact arms, contact surfaces on said contact arms, each contact arm having a finite weight, a metallic cylindrical sleeve, means mounting said contact arms and said metallic sleeve relatively insulated on said clutch driven member, switch spring means urging said contact arms toward each other to urge said contact surfaces into electrical contact engagement with said metallic sleeve, means providing separate electrical connections to said metallic sleeve and to said contact arms, whereby upon rotation of said clutch driven member above a predetermined speed, said contact arms centrifugally move said contact surfaces away from said metallic sleeve to break electrical contact therewith to open said torque switch, and whereby upon an overload in the torque requirements of said load said friction clutch slips to slow said clutch driven member to cause said contact surfaces of said arms to electrically contact said metallic sleeve to control said electrical control circuit to de-energize said motor.

5. In an electrical control circuit for an electric motor driving a load through a friction clutch having drive and driven members, a torque responsive switch comprising, in combination, first and second contact arms movably carried on said clutch driven member, contact surfaces on inner portions of said contact arms, each contact arm having a finite weight, a metallic cylindrical sleeve insulatively carried on said clutch driven member, switch spring means urging said contact arms toward each other to urge said contact surfaces into electrical contact engagement with said metallic sleeve, means providing separate electrical connections to said metallic sleeve and to said contact arms, whereby upon rotation of said clutch driven member above a predetermined speed, said contact arms centrifugally move away from said metallic sleeve to break electrical contact therewith to open said torque switch, and whereby upon an overload in the torque requirements of said load said friction clutch slips to slow said clutch driven member to cause said contact surfaces of said arms to electrically contact said metallic sleeve to control said electrical control circuit to de-energize said motor.

6. In an electrical control circuit for an electric motor driving a load from an output shaft having an axis, a torque responsive switch comprising, in combination, first and second pivot axes on said output shaft disposed perpendicular to the axis thereof and displaced equidistant therefrom, first and second weights pivoted on said first and second pivot axes, respectively, a metallic cylindrical sleeve insulatively carried on said output shaft, contact surfaces on the inner ends of said weights, switch spring means urging said weights toward each other to urge said contact surfaces into electrical contact engagement with said metallic sleeve, means providing separate electrical connections to said metallic sleeve and to said weights, whereby upon rotation of said output shaft above a predetermined speed, said weights centrifugally move away from said metallic sleeve to break electrical contact therewith to open said torque switch, and whereby upon an overload in the torque requirements of said load said output shaft slows to cause said weights to electrically contact said metallic sleeve to control said electrical control circuit to de-energize said motor.

7. In an electrical control circuit for an electric motor driving a load through a friction clutch having drive and driven members, a torque responsive switch comprising, in combination, a pivot axis on said clutch driven member disposed substantially perpendicular to the axis thereof and displaced therefrom, a weight pivoted on said pivot axis, a metallic contact sleeve insulatively carried on said clutch driven member, a contact surface on the inner end of said weight, switch spring means urging said weight toward the axis of said driven member to urge said contact surface into electrical contact engagement with said metallic sleeve, means providing separate electrical connections to said metallic sleeve and to said weight, whereby upon rotation of said clutch driven member above a predetermined speed, said weight centrifugally moves away from said metallic sleeve to break electrical contact therewith to open said torque switch, and whereby upon an overload in the torque requirements of said load said friction clutch slips to slow said clutch driven member to cause said weight to electrically contact said metallic sleeve to control said electrical control circuit to de-energize said motor.

8. In an electrical control circuit for an electric motor driving a load through a friction clutch having drive and driven members, a torque responsive switch comprising, in combination, first and second pivot axes on said clutch driven member disposed perpendicular to the axis thereof and displaced substantially equidistant therefrom, first and second weights pivoted on said first and second pivot axes, respectively, a metallic cylindrical sleeve insulatively carried on said clutch driven member, contact surfaces on said weights, switch spring means urging said weights toward each other to urge said contact surfaces into electrical contact engagement with said metallic sleeve, means providing separate electrical connections to said metallic sleeve and to said weights, whereby upon rotation of said clutch driven member above a predetermined speed, said weights centrifugally move said contact surfaces away from said metallic sleeve to break electrical contact therewith to open said torque switch, and whereby upon an overload in the torque requirements of said load said friction clutch slips to slow said clutch driven member to cause said weights to electrically contact said metallic sleeve to control said electrical control circuit to de-energize said motor.

9. In an electrical control circuit for an electric motor driving a load through a friction clutch having drive and driven members, a torque responsive switch, comprising, in combination, first and second pivot axes on said clutch driven member disposed perpendicular to the axis thereof and displaced equidistant therefrom, first and second weights pivoted on said first and second pivot axes, respectively, a metallic cylindrical sleeve, means electrically insulating and journalling said metallic sleeve coaxially on said clutch driven member, contact surfaces on the inner ends of said weights, switch spring means urging said weights toward each other to urge said contact surfaces into electrical contact engagement with said metallic sleeve, means providing separate electrical connections to said metallic sleeve and to said weights, whereby upon rotation of said clutch driven member above a predetermined speed less than the operational speed of said motor, said weights centrifugally move away from said metallic sleeve to break electrical contact therewith, and whereby upon an overload in the torque requirements of said load said friction clutch slips to slow said clutch driven member to cause said weights to electrically contact said metallic sleeve to control said electrical control circuit to de-energize said motor.

10. In a garage door operator for opening and closing an overhead garage door, the provision of, in combination, an electric motor having an output, a friction clutch having drive and driven members, means fixedly attaching said drive clutch member to said motor output, a drive shaft, means fixedly connecting said clutch driven member on said drive shaft, a threaded end on said drive shaft, a nut engaging said threaded end, clutch spring means disposed between said nut and said clutch driven member, variable compression of said clutch spring means by said nut effecting variable friction engagement between said clutch drive and driven members, linkage means connecting said drive shaft to a door to move same, first and second pivot axes on said clutch driven member disposed perpendicular to the axis of said worm and displaced equidistant therefrom, first and second weights pivoted on said first and second pivot axes, respectively, a metallic cylindrical sleeve, means insulatingly journalling said metallic sleeve coaxially on said clutch driven member, contact surfaces on the inner ends of said weights, switch spring means urging said weights toward each other to urge said contact surfaces into electrical contact engagement with said metallic sleeve, means grounding said clutch driven member and said weights to said motor, an electrical control circuit for said motor to control energization thereto, a torque switch connected in said electrical control circuit and including said metallic sleeve and said weights, an electrical clamp member as part of said torque switch clamped on said metallic sleeve, electrically insulated means to support said clamp in a fixed position relative to said motor stator, an electrical terminal on said clamp means connected to said electrical control circuit, whereby upon rotation of said clutch driven member above a predetermined speed less than the operational speed of said motor, said weights centrifugally move away from said metallic sleeve to break electrical contact therewith, and whereby said garage door is adapted to meet obstruction to cause an overload in the output torque requirements of said motor to cause said clutch to slip and slow said clutch driven member to cause said weights to contact said metallic sleeve and ground said terminal on said clamp means to control said electric motor control circuit to de-energize said motor.

11. An overload torque responsive switch for a motor id a friction clutch having drive and driven members, omprising, in combination, first and second pivot axes 1 said clutch driven member disposed transverse to the xis thereof and displaced equidistant therefrom, first nd second weights pivoted on said first and second pivot xes, respectively, the center of gravity of each said eight being displaced from a plane defined by said pivot tes, a metallic cylindrical sleeve, first and second elecical insulating rings journalling said metallic sleeve cotially on said clutch driven member, contact surfaces n the inner ends of said weights, spring means urging iid weights toward each other to urge said contact surces into electrical contact engagement with said metallic eeve, means grounding said clutch driven member to iid motor, said torque switch including said metallic eeve and said weights, an electrical clamp member as art of said torque switch clamped on said metallic eeve, electrically insulated means to support said clamp a fixed position relative to said motor, an electrical rminal on said clamp means, whereby upon rotation f said clutch driven member above a predetermined )eed less than the operational speed of said motor, said eights centrifugally move away from said metallic sleeve ) break electrical contact therewith, and whereby upon n overload in the output torque requirements of said iotor said friction clutch slips to slow said clutch driven iember to cause said weights to electrically contact said ietallic sleeve to close said torque switch.

12. In an electrical control circuit for an electric motor riving a load through a friction clutch having drive and riven members, comprising, in combination, first and :cond pivot axes on said clutch driven member disposed ansverse to the axis thereof and displaced equidistant ierefrom, first and second weights pivoted on said first and second pivot axes, respectively, the center of gravity of each said weight being displaced from a plane defined by said pivot axes, a metallic cylindrical sleeve, first and second electrical insulating rings journalling said metallic sleeve coaxially on said clutch driven member, contact surfaces on the inner ends of said weights, spring means urging said weights toward each other to urge said contact surfaces into electrical contact engagement with said metallic sleeve, means grounding said clutch driven member to said motor, said torque switch connected in said electrical control circuit and including said metallic sleeve and said weights, an electrical clamp member as part of said torque switch clamped on said metallic sleeve, electrically insulated means to support said clamp in a fixed position relative to said motor, an electrical terminal on said clamp means connected to said electrical control circuit, whereby upon rotation of said clutch driven member above a predetermined speed less than the operational speed of said motor, said weights centrifugally move away from said metallic sleeve to break electrical contact therewith, and whereby upon an overload in the torque requirements of said load said friction clutch slips to slow said clutch driven member to cause said weights to contact said metallic sleeve and ground said terminal on said clamp means to control said electric motor control circuit to de-energize said motor.

References Cited in the file of this patent

UNITED STATES PATENTS

| | | |
|---|---|---|
| 992,870 | Hanright | May 23, 1911 |
| 1,833,542 | Trimble | Nov. 24, 1931 |
| 2,572,785 | Vaughn | Oct. 23, 1951 |
| 2,825,776 | Curtis | Mar. 4, 1958 |